United States Patent Office 3,344,023
Patented Sept. 26, 1967

3,344,023
TREATMENT OF HYPERTENSION WITH L-ALPHA-METHYL-3,4-DIHYDROXYPHENYLALANINE
Donald F. Reinhold and Meyer Sletzinger, North Plainfield, N.J., assignors to Merck & Co., Inc., Rahway, N.J., a corporation of New Jersey
No Drawing. Filed Feb. 1, 1963, Ser. No. 255,641
1 Claim. (Cl. 167—65)

This application is a continuation-in-part of our application Ser. 51,479, filed Aug. 24, 1960, which in turn, is a continuation-in-part of our application Ser. No. 20,813, filed Apr. 8, 1960, both now abandoned.

This invention relates to a method of treating hypertension. More specifically, this invention relates to the use in the treatment of hypertension of compounds of the formula

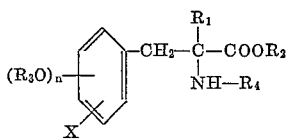

in which $R_1$ is lower alkyl, $R_2$ may be hydrogen or alkyl, $R_3$ and $R_4$ each may be hydrogen or lower alkanoyl, X may be hydrogen, halogen, alkyl, or trifluoromethyl, X being in a position para to the amino acid side chain when it is other than hydrogen, and $n$ may be 1, 2, or 3, the said compounds being in the L or sinister absolute spacial configuration, i.e., the same spacial configuration as L-dihydroxyphenylalanine, and substantially free of the D or rectus enantiomorphs, as well as the non-toxic salts of such compounds.

The DL racemic form of α-methyl-β-(3,4-dihydroxyphenyl)alanine is described in U.S. Letters Patent 2,868,818. This compound has now been found by thorough clinical testing to be a very valuable anti-hypertensive agent. It has been found especially valuable in those cases of hypertension where kidney damage has also occurred. It is also especially useful in cases of a malignant hypertension. Furthermore, experimental work has demonstrated that many of its homologs, isomers and analogs, belonging to the class defined above, share with this compound the properties which make it so useful therapeutically.

We have found that the compounds of the class defined above have the therapeutic activity solely in the L or sinister spacial configuration and that, consequently, the L form of this class of compounds, substantially free of the D or rectus spacial configuration, are more potent and less toxic than the racemic mixtures. In this configuration the removal of the D form from the racemic mixture is not merely the removal of an inert ingredient, for while the D form is therapeutically inert as an antihypertensive agent, it is just as toxic as the L form. Consequently, its removal is important in providing a safer drug. The therapeutic index (usually defined as the therapeutic dose divided by the toxic dose) is thus greatly decreased by removal of the D form.

It is most surprising to find that all the therapeutic activity resides in the L form although the D form is still as toxic as the L form. Toxicity is a form of biological activity and compounds which show biological activity usually have toxicity associated therewith. In this case, both of the enantimorph forms of the above class have the identical toxicity but all the therapeutic activity resides solely in the L form.

I—Synthesis of Starting Ketone

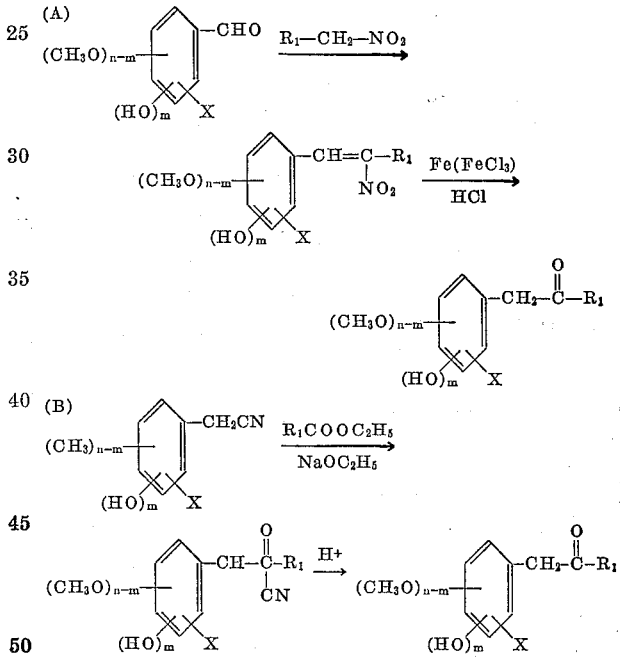

II—Hydantoin Synthesis

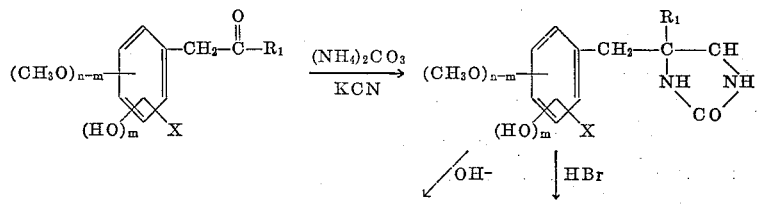

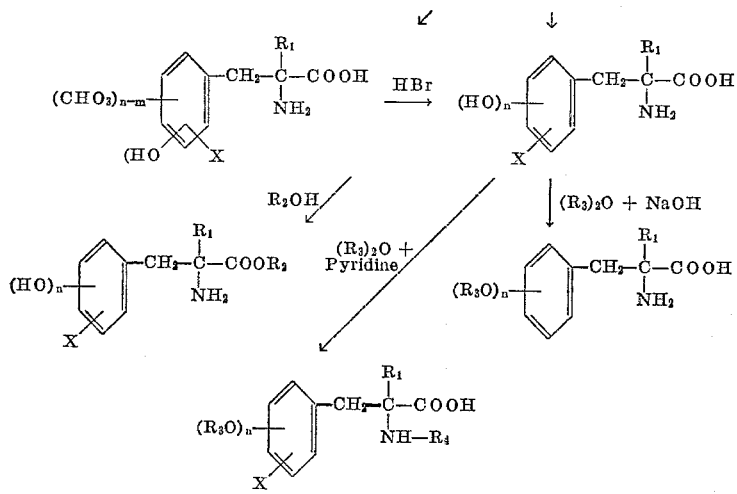

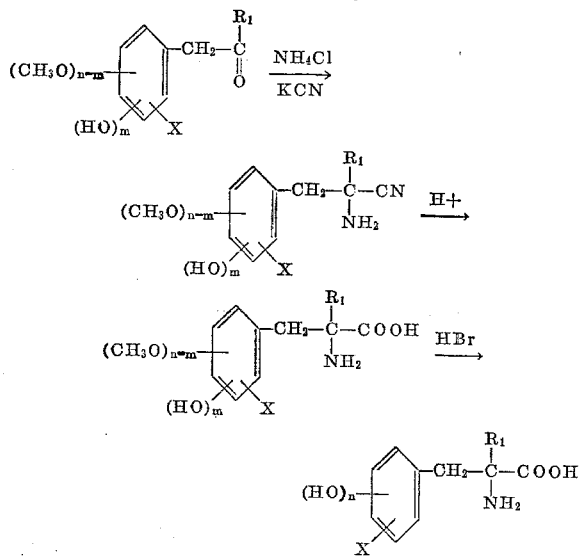

NOTE: As in chemical flow sheet II, this final product can be used to introduce $R_2$, $R_3$ and $R_4$.

In the synthesis of the compounds used in our invention, the starting material is a ketone whose preparation is shown in schematic chemical flow sheet I. With reference to this chemical flow sheet, it can be seen that there are two general syntheses for the starting ketones, the first from a substituted benzaldehyde by reaction with a nitroalkane and the second from a substituted phenylacetonitrile by a Claisen condensation, followed by ketone splitting. It should be noted in the general formulae of the starting materials and of the ketones that normally one uses methoxy substituted phenyl radicals but that one hydroxyl may be present. Thus, in the general formulae indicated, $n$ may be 1, 2, or 3 while $m$ may be 0 or 1. It is not advisable to have more than one free hydroxyl because of the sensitivity of these structures to oxidation. It should be noted that vicinal dimethoxy substituents can be replaced with a methylene dioxy bridge such as in piperonal. It should also be noted that a further substituent, X, may be present on the phenyl ring. This substituent may be hydrogen, halogen, alkyl or trifluoromethyl, and when it is other than hydrogen, it must occupy the position para to the ketone side chain which eventually will become the amino acid side chain.

The racemic amino acids are prepared by two standard methods which are shown in detail in chemical flow sheets II and III. In chemical flow sheet III, the synthesis has been stopped at the free hydroxyphenylamino acid stage but as is indicated there, the further step of esterification either of the carboxy group or of the hydroxyls, can be equally well carried out.

Of the two procedures, the preferred procedure is that shown in chemical flow sheet II. It consists of heating the starting ketone with ammonium carbonate and a water-soluble cyanide salt in aqueous solution to form a hydantoin derivative. This hydantoin derivative can be directly hydrolyzed by a hydrohalic acid to the free hydroxyphenylamino acid. Alternatively, the hydantoin ring may be split with a base, e.g. barium hydroxide or sodium or potassium hydroxide to give the methoxyphenyl amino acid structure which, in turn, upon treatment with a hydrohalic acid, gives the hydroxyphenyl amino acid. As indicated in the flow sheet, by proper treatment with an alkanol or with an alkanoic anhydride, one can prepare esters of the free amino acid in which either the carboxy or the ring hydroxyls are esterified.

The alternative synthesis requires the condensation of the starting ketone with ammonium chloride and a water soluble cyanide salt to form an aminonitrile. Acid hydrolysis of this converts the nitrile group first to the amide, and then to the free amino acid, and this, upon further treatment with a hydrohalic acid, gives the hydroxyphenylamino acids.

The above chemical synthesis produces the racemic mixtures. In order to produce the L form free of the D form as required by our invention, it is necessary to resolve the racemic mixture at some point in or after the synthesis. We have found by comparison of the rotary dispersion curve with an authentic sample of D(+)-dihydroxyphenylalanine and the known curve for its L isomer that the laevorotatory form at the D line of α-methyl-β-(3,4-dihydroxyphenyl)alanine—the form in which all the therapeutic activity resides—belongs to the L or sinister spatial configuration family. Such a spatial arrangement may be described by

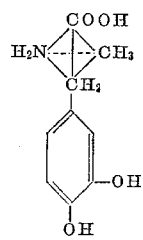

in which the tetrahedron represents the asymmetric α carbon. It is also often written

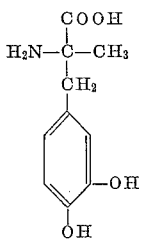

Experiments on other members of the class confirm that the activity resides in the L form analogous to the above formulae.

The racemic mixtures can be resolved at any point in the synthesis. Thus, as soon as the starting ketone has been condensed to form either the amino nitrile in that route or the hydantoin in the other route, there has been formed an asymmetric carbon and, consequently, a resolution of the racemic mixture can be carried out at any stage from there through the final product. Resolution at earlier stages in the synthesis has the advantage of permitting the recycling of the intermediate by regeneration of the starting ketone from the discarded D form.

The resolution of such enantimorphs can be carried out by a vast number of known methods. Thus, some racemic mixtures can be precipitated as eutectics instead of mixed crystals and can thus be quickly separated and in such cases can sometimes be selectively precipitated.

The more common method of chemical resolution is, however, greatly preferred. By this method diastereomers are formed from the racemic mixture by reaction with an optically-active resolving agent. Thus, an optically-active base can be reacted with the carboxyl group with or without blocking of the amino groups by such blocking methods as acylation. Similarly, an optically-active acid can be reacted with the amino group with or without blocking of the carboxy, as for example, by esterification, amide formation, or the use of the nitrile at an early stage in the synthesis. The difference in solubility between the diastereomers formed permits the selective crystallization of one form and regeneration of the optically-active amino acid from the mixture.

There is, however, a third method of resolving which shows great promise. This is one or the other forms of biochemical procedures using selective enzymatic reaction. Thus, the racemic amino acid can be subjected to an asymmetric oxidase or decarboxylase which will, by oxidation or decarboxylation, destroy one form, usually the L, leaving the other form unchanged. Even more attractive is the use of a hydrolysase on a derivative of the racemic mixture to form preferentially one form of the amino acid. Thus carboxy esters or carboxamides of the amino acids can be subjected to an esterase which will selectively saponify one enantiomorph and leave the other unchanged. Similarly, the acyl compounds may be subjected to a hydrolysis which will selectively deacylate one enantimorph and leave the enantimorphic amide unchanged.

In practice, we have preferred to carry out the resolution upon the final racemic amino acid, usually in the form of N-acyl derivatives. Two alternative products may be used. Either the intermediate methoxyphenylamino acid can be acylated and resolved or the free racemic hydroxyphenylamino acid is per-acylated to give an acyloxy phenyl N-acylamino acid and this is resolved. In both cases, the resolution is carried out by the formation of salts with optically-active bases. Such bases may include such compounds as quinine, brucine, cinchonidine, cinchonine, hydroxyhydrindamine, menthylamine, morphine, α-phenylethylamine, phenyloxynaphthylmethylamine, quinidine, 1-fenchylamine, strychnine, basic amino acids such as lysine, arginine, amino acid esters, and the like.

In the less preferred method of resolving the amino esters by making salts with optically-active acids, one may use such acids as α-bromocamphor-π-sulfonic acid, camphoric acid, camphor-10-sulfonic acid, helicin, malic acid, mandelic acid, menthoxyacetic acid, oxymethylene camphor, quinic acid, tartaric acid, 2,2′-dinitrodiphenic acid, and diacyltartaric acid, diacylglutamic acids and the like.

Among the compounds which may be used in our invention, there may be included the following compounds:

L-α-methyl-m-tyrosine
L-α-ethyl-m-tyrosine
L-α-propyl-m-tyrosine
L-α-butyl-m-tyrosine
L-α-methyl-p-chlor-m-tyrosine
L-α-ethyl-p-chlor-m-tyrosine
L-α-butyl-p-chlor-m-tyrosine
L-α-methyl-p-bromo-m-tyrosine
L-α-ethyl-p-bromo-m-tyrosine
L-α-butyl-p-bromo-m-tyrosine
L-α-methyl-p-fluoro-m-tyrosine
L-α-ethyl-p-fluoro-m-tyrosine
L-α-methyl-p-iodo-m-tyrosine
L-α-ethyl-p-iodo-m-tyrosine
L-α-methyl-p-methyl-m-tyrosine
L-α-methyl-p-ethyl-m-tyrosine
L-α-ethyl-p-ethyl-m-tyrosine
L-α-ethyl-p-methyl-m-tyrosine
L-α-methyl-p-butyl-m-tyrosine
L-α-methyl-p-trifluoromethyl-m-tyrosine
L-α-methyl, ethyl, propyl, or butyl-β-3,4-dihydroxyphenylalanine
L-α-methyl, ethyl, propyl, or butyl-β-2,3-dihydroxyphenylalanine
L-α-methyl, ethyl, propyl or butyl-4-chloro-2,3-dihydroxyphenylalanine
L-α-ethyl, methyl, propyl or butyl-β-4-methyl-2,3-dihydroxyphenylalanine
L-α-methyl, ethyl, propyl or butyl-β-4-fluoro-2,3-dihydroxyphenylalanine
L-α-methyl, ethyl, propyl or butyl-β-4-trifluoromethyl-2,3-dihydroxyphenylalanine
L-α-methyl, ethyl, propyl or butyl-β-3,5-dihydroxyphenylalanine
L-α-methyl, ethyl, propyl or butyl-β-4-chloro-3,5-dihydroxyphenylalanine
L-α-methyl, ethyl, propyl or butyl-β-4-fluoro-3,5-dihydroxyphenylalanine
L-α-methyl, ethyl, propyl or butyl-β-4-trifluoromethyl-3,5-dihydroxyphenylalanine
L-α-methyl, ethyl, propyl or butyl-2,5-dihydroxyphenylalanine
L-α-methyl, ethyl, propyl or butyl-β-4-chloro-2,5-dihydroxyphenylalanine
L-α-methyl, ethyl, propyl or butyl-β-4-methyl-2,5-dihydroxyphenylalanine
L-α-methyl, ethyl, propyl or butyl-β-4-trifluoromethyl-2,5-dihydroxyphenylalanine
L-α-methyl, ethyl, propyl or butyl-β-3,4,5-trihydroxyphenylalanine
L-α-methyl, ethyl, propyl or butyl-β-2,3,4-trihydroxyphenylalanine
L-α-methyl, ethyl, propyl or butyl-β-2,4,5-trihydroxyphenylalanine as well as the alkyl carboxy esters, such as methyl, ethyl, isopropyl, butyl, lauryl and octadecyl esters of the above compound and the lower alkanoyl derivatives such as the formyl, acetyl, propionyl and the like derivatives, both of the O-acyloxy and the N-acyloxy types.

In their use in vivo these optically-active amino acids of our invention may be given orally or parenterally. Dosage for oral administration will vary from 10–500 mg. per kg. per day. For oral administration to humans, the dosage range is from 0.1 to 5.0 g. per day, preferably 0.5 to 1.5 g. per day, usually in frequent small doses. The esters, both the carboxy type and the acyloxy type, because of their better absorption by the organisms, have a lower preferred range of the order of 0.2 to 2.5 g. per day, and may be given in less frequent larger doses.

These compounds can be used in our invention mixed with any of the conventional ingredients for tablets. They may also be given parenterally and can be mixed with any of the conventional materials and carriers used in composition for that method of application. They may also be mixed with any other anti-hypertensive agents in combination.

Our invention can be illustrated by the following examples.

A. PREPARATION OF STARTING KETONES

Example 1

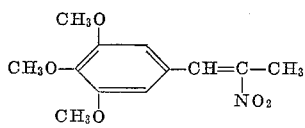

To a solution of 74.3 g. of 3,4,5-trimethoxybenzaldehyde in 121 ml. of toluene is added 50.1 g. of nitroethane, 3.03 ml. of n-butylamine and 3.60 ml. of glacial acetic acid. The mixture is refluxed and the water of reaction is steadily azeotropically removed by distillation. After the theoretical amount of water is distilled out, distillation is continued to remove excess reactants. The last trace of excess reactants is then removed at room temperature under a vacuum. The product is then triturated with a hydrocarbon solvent such as Skellysolve B and is thus obtained in a crystalline state. In general, however, it is preferred to dissolve the residue directly in toluene for use in the next step (see Example 2), without isolating the 1-(2-nitropropen-1-yl)-3,4,5-trimethoxybenzene.

When the above procedure is followed and an equivalent quantity of nitropropane, nitrobutane or nitropentane is used, the correspondingly substituted nitroalkenyl-trimethoxybenzene is obtained, namely, 1-(2-nitrobuten-1-yl)-, 1-(2-nitropenten-1-yl)- and 1-(2-nitrohexen-1-yl)-3,4,5-trimethoxybenzene. Similarly, when 2,3,4-trimethoxybenzaldehyde and 2,4,5-trimethoxyphenylbenzaldehyde are substituted for the 3,4,5-trimethoxyphenyl in the above procedure, the corresponding trimethoxy isomer is obtained. Such substitution can be done when the other reagent is nitroethane, nitropropane, nitrobutane or the like.

Example 2

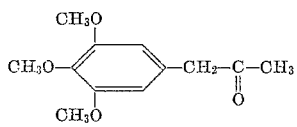

To a mixture of 137.4 g. of 40-mesh iron, 2.75 g. of hydrated ferric chloride and 172 ml. of water, there is added 96.0 g. of 1-(2-nitropropen-1-yl)-3,4,5-trimethoxybenzene (the product of Example 1) dissolved in 50 ml. of toluene. The mixture is heated to reflux and 248 ml. of concentrated hydrochloric acid is added drop-wise at a rate calculated to keep the mixture refluxing vigorously. After the hydrochloric acid is all added, the refluxing is continued by the application of heat for several hours. A silicaceous filter aid is then added to the cooled reaction mixture and the material is removed by filtration. The filter cake is washed four times, each time with 90 ml. of benzene. The organic layer is then separated from the filtrate. The water layer is acidified to a pH of 2 and extracted three times with 90 ml. portions of benzene. These extracts are then combined with the organic solvent layer and the combined organic phase is extracted four times with 100 ml. portions of water. It is then stirred for an hour with 230 ml. of 10% sodium bisulfite solution. The organic solvent phase is then separated, washed seven times with 100 ml. portions of water and dried over magnesium sulfate. Evaporation of the solvent gives 1-(3,4,5-trimethoxyphenyl)-2-propanone in the form of an oil.

Similarly, when the corresponding 1-(2-nitrobuten-1-yl)-1-(2-nitropenten-1-yl)- or 1-(2-nitrohexen-1-yl)-3,4,5-trimethoxybenzene or their 2,3,4 and 2,4,5-trimethoxy isomers, prepared in Example 1 by using nitropropane, nitrobutane, or nitropentane, is substituted for the 1-(2-nitropropen-1-yl)-3,4,5-trimethoxybenzene in equivalent quantities, one obtains the 1-(3,4,5-trimethoxyphenyl) or 2,3,4 or 2,4,5-2-butanones, -2-pentanones, and -2-hexanones.

Example 3

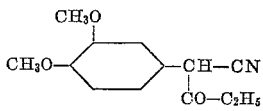

A solution of 88.5 g. of 3,4-dimethoxyphenylacetonitrile in 198 ml. of ethyl propionate is added to a freshly prepared solution of sodium ethoxide in ethanol prepared by dissolving 34.5 g. of sodium metal in 400 ml. of absolute ethanol containing 2% benzene. This solution is refluxed for hour hours and the filtrate is washed with 200 ml. of ethyl acetate and 200 ml. of ether. The resulting sodium salt of propionyl-(3,4-dimethoxyphenyl) acetonitrile is dissolved in 1200 ml. of water and cooled in an ice bath to 10° C. To this solution is added 115 ml. of glacial acetic acid over a 30-minute period. The mixture is extracted with water and the ether layer washed until neutral. The ether layer is dried and concentrated in vacuo to form 1-cyano-1-(3,4-dimethoxyphenyl)-2-butanone as a viscous orange oil.

When in the above procedure ethyl butyrate or ethyl valerate are used in place of the propionic acid, the corresponding 1-cyano-1-(3,4-dimethoxyphenyl)-2-pentanone and 1-cyano-1-(3,4-dimethoxyphenyl)-2-hexanone are obtained.

Example 4

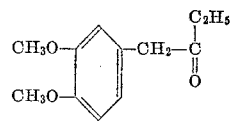

1-cyano-1-(3,4-dimethoxyphenyl)-2-butanone (the product of Example 3) is added with stirring over a one-hour period to a solution of 250 ml. of concentrated (98%) sulfuric acid and 60 ml. of water at a temperature of 0–5° C. The mixture is heated at 80° C. for 10 minutes. The mixture is then heated on a steam bath at 90° C. for three hours. An oil separates upon cooling. This mixture is extracted with four 200 ml. portions followed by two 100 ml. portions of ether. The ether layers are combined and washed with 100 ml. of 5% aqueous solution of sodium bicarbonate and 100 ml. of water. The ether layer is dried and concentrated until liquid 1-(3,4-dimethoxyphenyl)-2-butanone is obtained.

When any of the other products of Example 3 are substituted in the above procedure, the corresponding 1-(3,4-dimethoxyphenyl)-2-pentanone and -2-hexanone are obtained.

Example 5

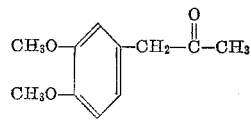

The procedures of Examples 1 and 2 are followed using an equivalent quantity of 3,4-dimethoxybenzaldehyde in place of the trimethoxybenzaldehyde to give 1-(3,4-dimethoxyphenyl)-2-propanone, which is also preparable by the procedures of Examples 17, 18 and 19 of U.S. Patent 2,868,818, where it is named methyl-(3,4-dimethoxybenzyl)-ketone. When 2,3-dimethoxybenzaldehyde, 2,4-dimethoxybenzaldehyde or 3,5-dimethoxybenzaldehyde are substituted for the 3,4-isomer, the corresponding 1-(2,3-, 2,4- or 3,5-dimethoxyphenyl)-2-propanone is obtained. Similarly, when equivalent quantities of nitropropane, nitrobutane and nitropentane are substituted for the nitroethane in the procedure of Example 1, the corresponding 1-(3,4-dimethoxyphenyl)-2-butanone, 2-pentanone and 2-hexanone are obtained after the procedure of Example 2 has been carried out on the product.

Similarly, when 4-chlor-2-3-dimethoxybenzaldehyde (preparable from 4-nitro-2,3-dimethoxybenzoic acid by $Na_2S$ reduction of the nitro to an amino group, replacement of the amino group by chlorine by a Sandmeyer reaction with $Cu_2Cl_2$, and conversion of the carboxylic acid group to an aldehyde either by oxidation of the hydrazide of the acid with potassium ferricyanide or by distillation of a mixture of the calcium salt and calcium formate), 4-bromo-2,3-dimethoxybenzaldehyde (similarly preparable, using $Cu_2Br_2$ in the Sandmeyer reaction), 4-iodo-2,3-dimethoxybenzaldehyde (similarly preparable using KI in the Sandmeyer reaction), 4-fluoro-2,3-dimethoxybenzaldehyde (similarly preparable, using fluoroboric acid in the Sandmeyer-like reaction to replace amino with fluoro), 4-methyl-2,3-dimethoxybenzaldehyde (preparable by methylation of 4-methyl-2,3-dihydroxybenzaldehyde acid with dimethyl sulfate in the presence of alkali), 4-trifluoromethyl-2,3-dimethoxybenzaldehyde (preparable from the 4-methyl-2,3-dimethoxybenzaldehyde by oxidation of the aldehyde to the 4-methyl-2,3-dimethoxybenzoic acid with hydrogen peroxide, reaction of the carboxylic acid group with $SF_4$ to form the $CF_3$ group, followed by oxidation of the methyl group to the carboxylic acid group with dichromate and reduction of the COOH to CHO), 4-chloro-3,5-dimethoxybenzaldehyde (preparable by methylation of 4-nitro-3,5-dihydroxytoluene with dimethylsulfate in the presence of alkali, reduction of the nitro to an amino group with $Na_2S$, replacement of the amino group by a Sandmeyer reaction using $Cu_2Cl_2$, and conversion of the methyl group to an aldehyde by side chain chlorination to the chlormethyl followed by heating with hexamethylene tetramine and water), 4-fluoro-3,5-dimethoxybenzaldehyde (similarly preparable using fluoroboric acid in the Sandmeyer-like replacement of the amino group), 4-methyl-3,5-dimethoxybenzaldehyde (preparable from 3,5-dimethoxy-p-toluic acid by the conversion of the carboxy group to an aldehyde group by oxidation of the acid hydrazine with ferricyanide or by distillation of a mixture of the calcium salt and calcium formate) or 4-trifluoromethyl-3,5-dimethoxybenzaldehyde (preparable from 4-nitro-3,5-dihydroxytoluene by methylation of the hydroxyls with dimethyl sulfate in the presence of alkali reduction of the nitro to an amino with sodium sulfied, replacement of the amino with cyano by the Sandmeyer reaction, hydrolysis of the nitrile to carboxylic acid with mineral acid, conversion of the carboxylic acid to $CF_3$ by reaction with $SF_4$ and conversion of the methyl to aldehyde by side-chain chlorination to chloromethyl followed by heating with hexamethylene tetramine and water) are substituted in equivalent quantities for the 3,4,5-trimethoxybenzaldehyde in the procedure of Example 1, and the product is then subjected to the procedure of Example 2, the correspondingly substituted 1-(4 substituted 2,3 or 3,5-dimethoxyphenyl)-2-propanone is obtained.

*Example 6*

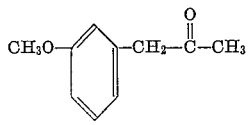

The procedures of Examples 1 and 2 are followed using an equivalent quantity of m-methoxybenzaldehyde in place of the trimethoxybenzaldehyde. The product is 1-(3-methoxyphenyl)-2-propanone.

When paramethoxybenzaldehyde is used in place of the metamethoxybenzaldehyde, the corresponding paramethoxyphenyl acetone is obtained. When an equivalent quantity of nitropropane, nitrobutane, or nitropentane is substituted for the nitroethane in the procedure of Example 1, the corresponding 1-(m- or p-methoxyphenyl)-2-butanones, -2-pentanones and -2-hexanones are obtained.

When instead of metamethoxybenzaldehyde in the procedure of Example 1, there is used an equivalent quantity of 4-chloro-3-methoxybenzaldehyde, 4-bromo-3-methoxybenzaldehyde, 4-fluoro-3-methoxybenzaldehyde (preparable analogously to the chloro or bromo compound by methylating 4-nitro-3-hydroxybenzaldehyde, reducing the nitro to the amine with $Na_2S$ or sodium hydrosulfite, and replacement of the amino group by a Sandmeyer-like reaction using fluoroboric acid to decompose the diazonium salt), 4-iodo-3-methoxybenzaldehyde (similarly preparable like the chloro analog by using potassium iodide to decompose the diazonium salt), 4-methyl-3-methoxybenzaldehyde, or 4-trifluoromethyl-3-methoxybenzaldehyde (preparable from 2-methoxy-4-toluic acid by conversion of the carboxy group to $CF_3$ by reaction with $SF_4$, followed by conversion of the methyl to aldehyde by side-chain chlorination to the chloromethyl followed by heating with hexamethylenetetramine and water) and the product is subjected to the procedure of Example 2, there is obtained the corresponding 1-(4-substituted 3-methoxyphenyl)-2-propanone.

*Example 7*

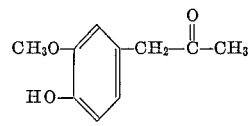

The procedures of Examples 1 and 2 are followed using an equivalent quantity of vanillin in place of the trimethoxybenzaldehyde used in Example 1 to give 1-(4-hydroxy-3-methoxyphenyl)-2-propanone. When an equivalent quantity of nitropropane, nitropentane, or nitrobutane is substituted for the nitroethane used in the procedure of Example 1, there are obtained the corresponding 1-(4-hydroxy-3-methoxyphenyl) - 2 - butanone, -2-pentanone and -2-hexanone.

*Example 8*

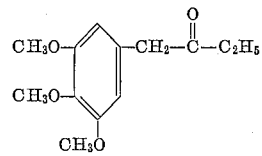

The procedures of Examples 3 and 4 are followed substituting an equivalent quantity of 3,4,5-trimethoxyphenylacetonitrile for the dimethoxyphenylacetonenitrile used in Example 3. There is thus obtained 1-(3,4,5-trimethoxyphenyl)-2-butanone. Similarly, when 2,4,5-trimethoxyphenylacetonitrile is used in place of the 3,4,5 isomer, the corresponding 1-(2,4,5-trimethoxyphenyl)-2-butanone is obtained.

B. SYNTHESIS OF RACEMIC AMINO ACIDS

*Example 9*

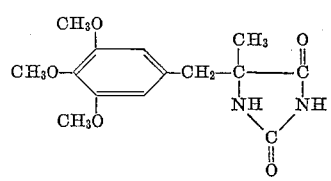

To a solution of 165 g. of ammonium carbonate and 35.4 g. of potassium cyanide in 484 ml. of water, there is added 48.0 g. of 1-(3,4,5-trimethoxyphenyl)-2-propanone (the product of Example 2) in 484 ml. of ethanol while keeping the temperature at 25–60° C. The mixture is stirred and held at 55–60° C. for 18 hours. It is then concentrated to one-third of its original volume under a vacuum. The mixture is then chilled in an ice bath and the crystalline (5-methyl)-5-(3,4,5-trimethoxybenzyl) hydantoin is filtered, washed and dried. It may be recrystallized from 50% aqueous ethanol.

When any of the other products of Example 2 or any of the products described in Examples 4, 5 or 6 are substituted for the product of Example 2 in the above procedure, the correspondingly substituted hydantoin is obtained.

*Example 10*

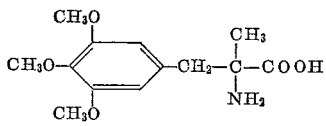

An autoclave is charged with 10 g. of the product of Example 9, 45 g. of barium hydroxide octahydrate and 226 ml. of water. The autoclave is then heated at 150° for 18 hours. The charge is then removed and carbon dioxide is passed through the mixture at 50° C. The precipitated barium carbonate is removed by filtration and exhaustively washed with hot water. The filtrate and washings, having a pH of 7.8, are treated with 2 N-sulfuric acid until a pH of 6.4 is obtained. The mixture is then filtered while hot through a silicaceous filter-aid and the cake is washed with hot water. The filtrate is concentarted to dryness to yield the desired α-methyl-trimethoxyphenylalanine.

When any of the other hydantoin products obtained by the procedure of Example 9 are substituted in equivalent quantities in the above procedure, the correspondingly substituted α-alkyl-β-trimethoxyphenylalanine is obtained.

*Example 11*

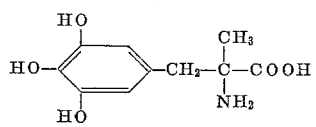

To 124 ml. of 48% hydrobromic acid there is added 9.15 g. of α-methyl-β-(3,4,5-trimethoxyphenyl)alanine (the product of Example 10). The mixture is purged with nitrogen and then refluxed for 5 hours. It is then concentrated to near dryness under a vacuum. The resulting gum is then flushed twice, alternatively, with each of tertiary butanol and water. The hydrobromide salt of the product is dissolved in water and passed through a column containing 41.5 g. of weakly basic ion exchange resin (Amberlite IR–45) on the hydroxide cycle (1.85 mg./g.). The column is eluted with 800 ml. of water. The eluate is concentrated under reduced pressure to 20 ml. at which point the α-methyl-β-(3,4,5-trihydroxyphenyl)alanine crystallizes out. The product is filtered and washed with isopropyl alcohol.

When any of the other products obtained by the procedure of Example 10 is substituted in equivalent quantities for the product of Example 10 in the above procedure, the correspondingly substituted trihydroxyphenyl alanine is obtained. In the case of those isomers having an ortho hydroxyl there is some tendency for lactone formation. In such cases, when the hydrobromide is dissolved in water for treatment with the ion-exchange resin, care must be taken to allow the solution to stand long enough for such lactone to hydrolyze.

*Example 12*

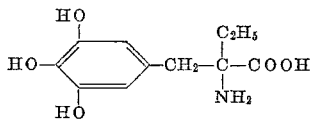

The procedures of Examples 9, 10 and 11 are followed, using the product of Example 8 in equivalent amount in place of the product of Example 2 in the procedure of Example 9, to give α-ethyl-β-(3,4,5-trihydroxyphenyl)-alanine. When any of the other products described in Examples 2, 4, 5, 6 and 8 are substituted for the product of Example 2 in the above procedure, the correspondingly substituted α-alkyl-β-trihydroxyphenyl alanine is obtained.

*Example 13*

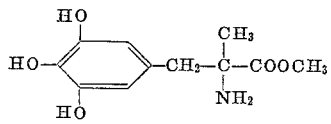

A suspension of 25 g. of the product of Example 11 in 250 ml. of anhydrous methanol is saturated with hydrogen chloride while being held at 10–20° C. The mixture is then refluxed three hours after which it is allowed to stand for 18 hours. The solvent is removed under a vacuum and the residue is redissolved in 50 ml. of methanol under nitrogen. The methanol is then removed under a vacuum. The addition of methanol is twice repeated. The resulting hydrochloride salt of the methyl ester is then taken up in 50 ml. of water at 50° C. The solution is filtered and the pH of the filtrate is adjusted to 8.5 with concentrated ammonium hydroxide keeping the mixture under nitrogen at 5–10° C. The mixture is then allowed to stand for 6 hours at 5°, under nitrogen, after which it is filtered and the isolated product is washed three times with 15 ml. of water at 0° and then dried in a vacuum.

When ethanol, isopropanol, butanol, lauryl alcohol, and octadecanol are substituted for the methanol in the above procedure using longer times, the corresponding ethyl, isopropyl, butyl, lauryl and octadecyl esters are obtained.

*Example 14*

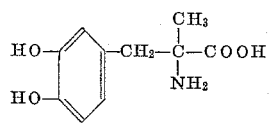

The procedures of Examples 9, 10 and 11 are followed using, in the procedure of Example 9, equivalent quantities of the products of Example 5 instead of the product of Example 2. Thus, there is obtained by this series of preparations, the racemic forms of α-methyl-β-(3,4 or 2,3 or 2,4 or 3,5 dihydroxyphenyl)alanine or their α ethyl, propyl, or butyl homologs. Also there are thus obtained α-methyl-β-(4-chloro, bromo, fluoro, methyl or trifluoromethyl 2,3 or 3,5-dihydroxyphenyl)alanine.

*Example 15*

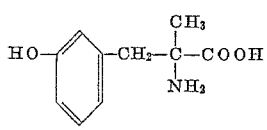

The procedures of Examples 9, 10 and 11 are followed using, in the procedure of Example 9, an equivalent quantity of the products of Example 6 instead of the product of Example 2. There are thus obtained α-methyl, ethyl or butyl-m-tyrosine and their p-chloro, bromo, fluoro, iodo, methyl, or trifluoromethyl derivatives.

Example 16

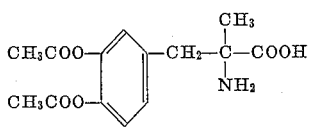

A mixture of 10 ml. of water and 5.73 g. (0.1432 mole) of sodium hydroxide is boiled and then cooled to room temperature. To the solvent is added 10 g. (0.0474 mole) of D,L-α-methyl-β-3,4-dihydroxyphenylalanine and 50 g. of ice water. While stirring the solution vigorously, there is added 11.13 ml. (0.1183 mole) of acetic anhydride. The product is stirred at 0° for one hour and then filtered. The product is washed three times with 10 ml. portions of a 9:1 mixture of isopropyl alcohol and water. The wet product is then dissolved in a mixture of 100 ml. of isopropyl alcohol and 25 ml. of water held at the boiling point. The hot solution is filtered and the filtrate is allowed to cool. The crystalline product which forms is isolated by filtration, washed and dried. It is D,L-α-methyl-β-3,4-diacetoxyphenylalanine.

When the other compounds described in Examples 11, 12, 14 and 15 are substituted in equivalent quantities for the main product of Example 14 in the above procedure, the corresponding diacetoxy derivatives are obtained. When in the above procedure in place of the acetic anhydride there is used in equivalent quantities of propionic anhydride and butyric anhydride the corresponding dipropanyl and dibutyryl compounds are obtained.

Example 17

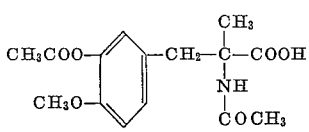

A mixture of 25 g. of α-methyl-β-3,4-dihydroxyphenyl alanine, 100 ml. of acetic anhydride and 75 ml. of pyridine is purged thoroughly with nitrogen. It is then heated to 90° C. for 2 hours. The mixture is allowed to stand overnight at room temperature, after which it is concentrated on a steam bath in vacuo to a thick syrup. The residue is stirred with ice water and made strongly acidic with 2,5 N-hydrochloric acid. The precipitated crystalline triacetate is isolated by filtration, washed thoroughly with ice water and dried over $P_2O_5$ in vacuo.

When the other products described in Examples 11, 12, 14 and 15 are substituted in equivalent quantities for the α-methyl-3,4-dihydroxyphenylalanine in the above procedure, the corresponding O,O N triacetyl derivatives are obtained. When the acetic anhydride in the above product is replaced by an equivalent quantity of propionic anhydride, butyric anhydride or formic acetic anhydride (J. Org. Chem. 23 728 (1958), the corresponding propanyl, butyryl and formyl derivatives are obtained.

Example 18

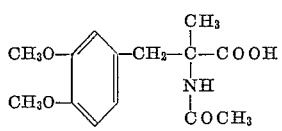

A mixture of 69 g. of DL-α-methyl-β-(3,4-dimethoxyphenyl)alanine (prepared as an intermediate in Example 14 and obtained by omitting the procedure of Example 11 at the end), 276 ml. of acetic anhydride and 207 ml. of pyridine are mixed and heated with stirring on a steam bath for three hours. The reaction mixture is allowed to cool and to stand at room temperature for an additional 18 hours. The mixture is then concentrated to a thick syrup. The syrup is poured into a beaker containing 300 ml. of ice water with stirring. The mixture is stirred for ten minutes and then made strongly acid with 150 ml. of 2,5 N hydrochloric acid. The resulting mixture, which is very thick, is cooled to 5° C., filtered and washed with cold water and then with 100 ml. of absolute ethanol. The product, DL-N-acetyl-α-methyl-β-(3,4-dimethoxyphenyl)-alanine, is dried over phosphorus pentoxide in vacuo.

C. RESOLUTION OF AMINO ACIDS

Example 19

L-N-ACETYL-α-METHYL-β-(3,4-DIMETHOXYPHENYL) ALANINE-L-α-PHENYLETHYLAMINE SALT

To a slurry of 2.1 g. of DL-N-acetyl-α-methyl-β-(3,4-dimethoxyphenyl)alanine in 4 ml. of methanol is added a solution of 0.91 g. of L-α-phenylethylamine in 1 ml. of methanol. The mixture is heated to reflux, diluted with 10 ml. of methanol and refluxed until solution is complete. The solution is clarified by filtration through a filter containing a diatomaceous earth ("Super-Cel"). The filter cake is washed with 10 ml. of water. The filtrate is heated allowing the methanol to distill until the internal temperature is 95° C. The solution is cooled to 60° C., seeded with the product L-N-acetyl-α-methyl-β-(3,4-dimethoxyphenyl)alanine-L-α-phenylethylamine salt and allowed to cool undisturbed to room temperature. The mixture is then aged at 8° C. in a refrigerator for an additional 18 hours. At the end of this aging period approximately half of the product L-N-acetyl-α-methyl-β-(3,4-dimethoxyphenyl)alanine-L-α-phenylethylamine salt has crystallized in the form of striated mounds. Seed crystals are formed by swirling the flask occasionally. The mixture is then aged for an additional 24 hours. The crude product L-N-acetyl-α-methyl-β-(3,4-dimethoxyphenyl)alanine 1-α-phenylethylamine salt is filtered, washed with cold water and dried in vacuo at 56° C. The specific rotation is $[\alpha]_D +55°$ (c.=1 in methanol). The mother liquors are collected for recovery of impure D-N-acetyl-α-methyl-α-(3,4-dimethoxyphenyl) alanine.

To 1.38 g. of the crude product is added 10 ml. of water and 2 ml. of ethanol. The mixture is heated without a condenser with stirring until complete solution occurs and the internal temperature is 98° C. The solution is allowed to cool slowly to room temperature and then aged at 8° C. for two hours. The semi-solid mixture is filtered, washed with a small amount of cold water and dried at 56° C. in vacuo, yielding pure L-N-acetyl-α-methyl-β-(3,4-dimethoxyphenyl)alanine 1-α-phenylethylamine salt. $[\alpha]_D +69°$ (c.=in methanol).

Example 20

D-N-ACETYL-α-METHYL-β-(3,4-DIMETHOXYPHENYL) ALANINE-d-α-PHENYLETHYLAMINE SALT AND THE CORRESPONDING L-1 SALT

To a slurry of 77 g. of DL-N-acetyl-α-methyl-β-(3,4-dimethoxyphenyl)alanine in 200 ml. of methanol is added 33.2 g. of d-(+)-α-phenylethylamine in 50 ml. of methanol. One liter of water is added and the methanol stripped in vacuo at 50° to 60° C. The aqueous solution is heated to 90° and clarified by filtration through diatomaceous earth ("Super-Cel"). The filtrate is seeded with D-N-acetyl-α-methyl-β-(3,4-dimethoxyphenyl)alanine d-α-phenylethylamine salt and allowed to cool undisturbed to room temperature. The mixture is aged at about 8° C. for 18 hours and filtered, and the precipitate of D-N-acetyl-α-methyl-β-(3,4-dimethoxyphenyl)alanine d-α-phenylethylamine salt is washed with a small amount of cold water and dried over phosphorus pentoxide in vacuo. $[\alpha]_D -59°$ (c.=1 in methanol). This salt has a negative rotation and the product of Example 19 has a positive rotation. A second crop is obtained by concentration of the mother liquors to a volume of about 700 ml. and aging at 5°–10° C. for 18 hours. A third crop is obtained by further concentration of the mother liquors to 400 ml. and aging at room temperature for 2 hours.

The remaining mother liquors are made alkaline with 50 ml. of 2.5 N sodium hydroxide and extracted with chloroform in two 100 ml. portions followed by two 50 ml.

portions. To the basic aqueous solution is added 15 ml. of glacial acetic acid, and the solution is aged 18 hours at about 8° C. The precipitate of impure L-N-acetyl-α-methyl-β-(3,4-dimethoxyphenyl)alanine is filtered, washed with cold water and dried in vacuo at 70° C. $[α]_D$—23° (c.=1 in methanol).

To a slurry of 30 g. of the L-N-acetyl-α-methyl-β-(3,4-dimethoxyphenyl)alanine obtained above in 200 ml. of methanol is added 13.0 g. of 1-(—)-α-phenylethylamine. A thick precipitate forms. This precipitate is dissolved by addition of 200 g. more methanol and 100 ml. of water and heating to reflux. The hot solution is treated with decolorizing charcoal, filtered and allowed to cool to room temperature. The mixture is aged at 10° C. for one hour and filtered. The precipitate of L-N-acetyl-α-methyl-β-(3,4-dimethoxyphenyl)alanine 1-(—) - α - phenylethylamine salt is washed with cold water and dried over phosphorus pentoxide for about 18 hours. $[α]_D$+68° (c.=1 in methanol).

*Example 21*

L-N-ACETYL-α-METHYL-β-(3,4-DIMETHOXYPHENYL) ALANINE

Twenty-five g. of L-N-acetyl - α - methyl-β-(3,4-dimethoxyphenyl)alanine 1-α-phenylethylamine salt (the product of Examples 19 and 20) is dissolved in 100 ml. of water and 27.5 ml. of 2.5 N sodium hydroxide. The solution is extracted with two 50 ml. portions followed by two 25 ml. portions of chloroform, and the extracts are saved for the recovery of 1-α-phenylethylamine. The extracted aqueous solution is partially acidified with 6 ml. of 2.5 N hydrochloric acid, heated to 70° C., transferred to a beaker and further acidified with 24 ml. of 2.5 N hydrochloric acid. A precipitate of L-N-acetyl-α-methyl-β-(3,4-dimethoxyphenyl)alanine forms immediately. The precipitate is cooled to 10° C., filtered, washed with cold water and dried in vacuo to 70° C. $[α]_D$—56° (c.=1 in methanol).

*Example 22*

L-α-METHYL-β-(3,4-DIHYDROXYPHENYL)ALANINE

A mixture of 10.0 g. of L-N-acetyl-α-methyl-β-(3,4-dimethoxyphenyl)alanine and 100 ml. of 48% by weight aqueous hydrobromic acid is purged with nitrogen and heated at reflux in a nitrogen atmosphere for 3–12 hours. The system is protected from air by a mercury trap. The mixture is concentrated to dryness under nitrogen. The residue is dissolved in 50 ml. of water and concentrated to dryness. This procedure is repeated successively with 50 ml. of t-butanol and 50 ml. of water. The residue is dissolved in 80 ml. of water, the pH adjusted to 6.4 with 6 N ammonium hydroxide and the mixture is treated with 0.2 g. of decolorized charcoal ("Darco G–60") and filtered while warm. The amber color solution is cooled, saturated with sulfur dioxide and concentrated under nitrogen to a volume of 30 ml. The mixture is aged in an ice bath for one hour and filtered. The cake is washed with a minimum amount of cold water and dried at 56° C. in vacuo. The resulting product is L-α-methyl-β-(3,4-dihydroxyphenyl)alanine (V). $[α]_D$—4°±2° (c.=1 in 1 N hydrochloric acid).

A second crop of crystals weighing 0.6 g. and having a negative bromide test is obtained by aging the mother liquors for 3 days at 8° C.

EXAMPLE 23

ETHYL ESTER OF L-α-METHYL-β-(3,4-DIHYDROXYPHENYL)ALANINE

A suspension of 95 g. (0.45 mole) of L-α-methyl-β-(3,4-dihydroxyphenyl)alanine in 950 ml. of absolute ethanol is saturated with dry hydrogen chloride at 10–20° C. and then refluxed for two hours. The reaction mixture is concentrated in vacuo. The residue is dissolved in absolute ethanol, and the solution is again concentrated in vacuo. This residue is dissolved in absolute ethanol, and the solution is saturated with dry hydrogen chloride at 10–20° C. and refluxed for two and one-half hours. The reaction mixture is concentrated in vacuo. The residue is dissolved in absolute ethanol followed by concentration. The procedure is repeated an additional two times. The residue from the final concentration is allowed to stand until crystals of the ethyl ester hydrochloride of α-methyl-β-(3,4-dihydroxyphenyl)alanine formed. A sample is allowed to stand in air and form a hydrate.

To the ethyl ester hydrochloride and mother liquors is added 420 ml. of 1.059 N sodium ethoxide, corresponding to about one equivalent per equivalent of ester hydrochloride. This results in an ethanol solution of the ethyl ester. This solution is concentrated to dryness. The residue is partitioned between methylene chloride and water, and the water layer is discarded. The methylene chloride layer is washed with water, dried over anhydrous sodium sulfate, and concentrated in vacuo until all methylene chloride is removed. The L-α-methyl-β-(3,4-dihydroxyphenyl)alanine is obtained as an amorphous material. $[α]_D$—10° (c.=1 in 1 N HCl).

When methanol, isopropanol, lauryl alcohol or octadecyl alcohol is used in place of the ethanol (the higher alcohols must be heated to render them liquid) in the above procedure, the corresponding methyl, i-propyl, lauryl and octadecyl esters are obtained.

EXAMPLE 24

L-N-ACETYL-α-METHYL-β-(3,4-DIACETOXYPHENYL) ALANINE QUININE SALT

A mixture of 96.4 g. of quinine free base and 100 g. of DL-N-acetyl-α-methyl-β-(3,4 - diacetoxyphenyl)alanine is charged to a flask and 960 ml. of acetone is added. The mixture is stirred until solution is completed and is then cooled to 0–5° for 4 hours. The precipitated salt is isolated by filtration, washed three times with 100 ml. batches of acetone and dried under a vacuum at 40° C. $[α]_D^{23}$—72.5° (c.=1–96% ethanol).

EXAMPLE 25

L-N-ACETYL-α-METHYL-β-(3,4-DIACETOXYPHENYL)ALANINE

The L-quinine salt obtained from Example 24 is treated with a cold solution (0.5°) of 11.0 ml. of 2.5 M hydrochloric acid in 60 ml. of water. To the clear solution is added 10.6 ml. of 2.5 M hydrochloric acid which causes the product to precipitate. The mixture is held overnight at 0–5°, after which the product is filtered, washed with water and dried under a vacuum. $[α]_D^{23}$—71.7°.

EXAMPLE 26

L-α-METHYL-β-3,4-(DIHYDROXYPHENYL)ALANINE

A solution of L-N-acetyl-α-methyl-β-(3,4 - diacetoxyphenyl)alanine (the product of Example 25) (25.0 g.) in 200 ml. of 6 M hydrochloric acid is refluxed two hours. The solvent is removed in vacuo and the residual yellow oil is flushed three times with 50 ml. portions of tert-butyl alcohol until the hydrochloric acid is completely removed. The gummy residue is dissolved in 45 ml. of water and filtered to remove trace amounts of insolubles. The aqueous solution is treated with 7.5 ml. of concentrated ammonia to bring the pH to 7.5 and then with 1.0 g. of sulfur dioxide. The desired product separates and the mixture is held at 0–5° overnight. The crystals are isolated by filtration, washed twice with 10 ml. portions of cold water and dried under a vacuum. $[α]_D^{23}$—4.0±2.0°.

EXAMPLE 27

L-α-METHYL-β-(3,4-DIHYDROXYPHENYL)ALANINE

An alternative procedure for conversion of crystalline quinine salt to the free acid is as follows:

The viscous solution obtained by dissolving 100 g. of L-N-acetyl-α-methyl-β-(3,4 - diacetoxyphenyl)alanine quinine salt (the product of Example 24) in 100 ml. of methanol is added at 65° C. with stirring to a solution of 10.2 g. of sodium oxalate in 500 ml. of water. The transfer is completed with 15 ml. of methanol. The heavy slurry of diquinine oxalate is cooled at 0–5° for two hours, filtered, washed three times with 80 ml. of water, and dried under a vacuum at 50°. The water-clear, neutral mother liquors and washes were distilled at atmospheric pressure to remove methanol. When the distillation temperature reaches 100°, distillation is stopped, 500 ml. of concentrated hydrochloric acid is added and the solution is heated at reflux for two hours. The reaction mixture is then concentrated to dryness under a vacuum, flushed with three 100 ml. portions of tert-butyl alcohol, and the residue is dissolved in 100 ml. of acetone. Sodium chloride is removed by filtration and the acetone filtrate treated with 13.8 g. of ethylene oxide and allowed to stand at 10° C. for several days. The product is filtered, washed with acetone and dried under a vacuum at 50° C. The crude product is contaminated with chloride ion, slurried in 350 ml. of water, and the pH is adjusted to 6.5 with 0.5 ml. of concentrated ammonium hydroxide and treated with 7.5 g. of sulfur dioxide. The mixture is stirred for 15 minutes and the insolubles are removed by filtration, washed with water and dried. The product thus obtained is L-α-methyl-β-(3,4-dihydroxyphenyl)alanine. $[\alpha]_D$ —1.50 (1 N HCl).

Further crops of the product can be obtained by treatment of the filtrate with activated charcoal and concentration.

Example 28

L-α-METHYL-m-TYROSINE

The procedures of Examples 24, 25 and 26 are followed using DL-α-methyl-m-tyrosine (the product of Example 15) in equivalent quantities in place of the DL-α-methyl-α-dihydroxyphenylalanine. $[\alpha]_D$=—2°±1° O=1 in 1 N HCl.

Similarly, when DL-α-methyl-p-methyl-m-tyrosine DL-α-methyl-p-chloro-m-tyrosine, DL-α-methyl-fluoro - m - tyrosine, DL-α-methyl-p-iodo-m-tyrosine, DL-α-methyl-p-bromo-m-tyrosine, DL-α-methyl-trifluoro-m-tyrosine or one of the racemic α-methyl-β-(4-chloro-bromo, fluoro, methyl, or trifluoromethyl)-2,3- or 3,5-dihydroxyphenyl alanines or the α-methyl-β-(2,3- or 2,4- or 3,5-dihydroxyphenyl) alanines or the α-ethyl, propyl or butyl-(3,4- or 2,3- or 2,4- or 3,5-dihydroxyphenyl) alanines described in Example 14 is used in place of the dihydroxyphenylalanine derivative in the procedure of Example 24 and the procedures of Examples 25 and 26 are followed, the L forms of these compounds are obtained.

Example 29

L-α-METHYL-β-3,4,5-(TRIHYDROXYPHENYL)ALANINE

The procedures of Examples 24, 25, and 26 are followed substituting, in the procedure of Example 24, DL-α-methyl-β-(3,4,5-trihydroxyphenyl)alanine in equivalent quantities for the α-methyl-β-3,4-(dihydroxyphenyl)alanine used in Example 24 to give the corresponding L-amino acid. Similarly, when the 2,3,4 or 2,4,5 isomeric compounds are used, the corresponding L form of the correspondingly substituted amino acid is obtained.

D. USE OF THE COMPOUNDS IN THE TREATMENT OF ANTI-HYPERTENSION

Example 30

A patient suffering from severe hypertension was treated with the indicated quantities of the drugs shown below, with the indicated results:

(a) 4.5 grams/day of d-α-methyl-3,4,dihydroxyphenylalanine produced no fall in blood pressure or other biological changes.

(b) 4.5 grams/day of racemic-α-methyl-3,4-dihydroxyphenylalanine produced a significant fall in both supine and standing blood pressure.

(c) 2.25 grams/day of 1-α-methyl-3,4-dihydroxyphenylalanine produced a significant fall in both supine and standing blood pressure.

Example 31

The inhibition of decarboxylase in humans was followed by administration of a large amount of tyrosine while administering equal quantities of various drugs and determining the quantity of tyramine found in the urine. The results with various drugs were as follows:

| Drug: | Tyramine/8 hr. |
|---|---|
| Control | 452 / 492 / 630 |
| dl-α-Methyl-3,4-dihydroxyphenylalanine | 72 / 46 / 54 |
| 1-α-Methyl-3,4-dihydroxyphenylalanine | 30 / 36 / 34 |
| d-α-Methyl-3,4-dihydroxyphenylalanine | 386 / 231 / 268 |

Example 32

Several hypertensive patients were successfully treated with dl-α-methyl-3,4-dihydroxyphenylalanine for periods of days each. One patient with an essential blood pressure of approximately 200 ml. of mercury dropped to a blood pressure of approximately 140 during the 5-day period of administration of 4.5 gms. of dl-compound daily. Upon the administration of 4.5 gms. of D-compound daily, the blood pressure returns to 200 ml. of mercury. When the D-compound was replaced by daily administration of 2.25 gm. of L-compound, the blood pressure dropped to approximately 130 during the entire period.

A second patient with essential blood pressure of approximately 150 followed the same pattern. The pressure during the administration of dl-compound dropping to about 110, rising to 150 to 160 during the administration of D-compound and falling again to a vicinity of 100–110 during the administration of the L-compound.

Example 33

Female albino mice (Carworth $CF_1$ strain), weighing 18 to 20 grams, were used for these studies. Ten animals were used at each dose level for each material. The animals were observed frequently on the day of drug administration and then daily for seven days.

Solutions for intravenous administration and for oral administration were prepared by dissolving the crystalline materials in dilute hydrochloric acid (pH about 2). Oral administration was by gavage using a metal catheter.

The lethal dose 50 values were calculated on the basis of seven-day mortality curve by the method of Carrol S. Weil, Biometrics 8: 249, 1952.

The results of the acute toxicity studies of the three isomeric forms of α-methyl-DOPA are summarized in Table 1.

The signs of toxicity following the intravenous and oral administration of the *racemic* and *levo* forms were similar. The signs included irritability, decreased respiratory rates, decreased activity, ptosis of the eyelids, lacrimation and clonic convulsions. In addition to these signs, twenty-four hours after the oral administration of the materials, the mice became aggressive and irritable. This effect lasted for approximately three days. Deaths occurred in one to two minutes following intravenous administration and in two to five days following oral administration.

Following the intravenous administration of the *dextro* form, the signs of toxicity included brief loss of the righting reflex, slowed respiration, clonic convulsions and respiratory depression before deaths which occurred in one to two minutes. Following the oral administration of the *dextro* form the signs of toxicity included increased irritability within five minutes, slowed respiration and lethargy with ptosis of the eyelids in thirty minutes. On the second day, lethargy, weakness, slowed respiration, coarse tremors and increased irritability were noted. Surviving animals appeared normal by the third day. Deaths occurred in one to twenty-four hours.

The lethal dose values of the racemic, dextro and levo forms of alpha-methyl-beta-(3,4-dihydroxyphenyl) alanine were in the same order of magnitude. Thus, there was no real difference between the $LD_{50}$ values of the three materials when given by the same route of administration.

We claim:

A method of treating hypertension which comprises the oral administration to a hypertensive patient of 0.1 to 5.0 g. of L-α-methyl-3,4-dihydroxyphenylalanine substantially free of its D form.

References Cited

UNITED STATES PATENTS

| | | | |
|---|---|---|---|
| 2,868,818 | 1/1959 | Pfister et al. | 167—65 |
| 2,969,372 | 1/1961 | Braun et al. | 260—310 |

OTHER REFERENCES

Beckett et al.; J. of Pharm. and Pharmacology, 7:7, pp. 433–455.

Chemical Abstracts 52:18,885 -d-8, 1958.

Karrer: Organic Chemistry 2nd ed., pp. 92–102 (1946).

Martin et al.: Exptl. Med. & Surgery, vol. 8, 1950— pp. 5–14.

Schaff et al.: Helv. Chem. Acta. vol. 7, pp. 357–363 (1924).

Stein et al.: JACS vol. 77, June 5, 1955, pp. 700–703.

LEWIS GOTTS, *Primary Examiner.*

FRANK CACCIAPAGLIA, JR., JULIAN S. LEVITT,
*Examiners.*

E. FRANK, R. L. HUFF, *Assistant Examiners.*

REEXAMINATION CERTIFICATE (73rd)

United States Patent [19]
Reinhold et al.

[11] B1 3,344,023

[45] Certificate Issued Apr. 12, 1983

[54] TREATMENT OF HYPERTENSION WITH L-ALPHA-METHYL-3,4 DIHYDROXYPHENYLALANINE

[75] Inventors: Donald F. Reinhold and Meyer Sletzinger, North Plainfield, N.J.

[73] Assignee: Merck & Co., Inc., Rahway, N.J.

Reexamination Request
No. 90/000,127, Dec. 21, 1981

Reexamination Certificate for:
Patent No.: 3,344,023
Issued: Sep. 26, 1967
Appl. No.: 255,641
Filed: Feb. 1, 1963

Related U.S. Application Data

[60] Continuation-in-part of Ser. No. 51,479, Aug. 24, 1960, abandoned; which is a continuation-in-part of Ser. No. 20,813, Apr. 8, 1960 abandoned.

[51] Int. Cl.³ ............................................. A61K 31/195
[52] U.S. Cl. ...................... 424/319; 562/446; 560/39
[58] Field of Search ........................... 424/319; 562/446

[56] References Cited

U.S. PATENT DOCUMENTS

| | | | |
|---|---|---|---|
| 2,868,818 | 1/1959 | Pfister et al. | 562/446 |
| 2,969,372 | 1/1961 | Braun et al. | 548/369 |

OTHER PUBLICATIONS

Beckett et al., Journal of Pharmacy and Pharmacology, vol. 7, pp. 433-35, (1955).

Beckett et al., Progress In Drug Research, vol. I, pp. 455-530, (1959).

Benson et al., Journal of Pharmacology and Experimental Therapeutics, vol. 109, pp. 189-200, (1953).

Easson et al., Biochemical Journal, vol. 27, pp. 1257-1266, (1933).

Eddy et al., Journal of Pharmacology and Experimental Therapeutics, vol. 98, pp. 121-137, (1950).

Jarrousse et al., Annales Pharmaceutiques Francaises, vol. 9, pp. 321-25, (1951).

Karrer, Organic Chemistry, Second English Ed., Elsevier Pub., pp. 92-102, (1946).

Martin et al., Experimental Medicine and Surgery, vol. 8, pp. 5-14, (1950).

May et al., Journal of Organic Chemistry, vol. 24, pp. 1435-37, (1959).

Oates et al., Science, vol. 131, pp. 1890-91, (1960).

Scott et al., Journal of Pharmacology and Experimental Therapeutics, vol. 93, pp. 282-286, (1948).

Sourkes, Arch. Biochim, Biophys., vol. 51, pp. 444-456, (1954).

Stein et al., Journal of the American Chemical Society, vol. 77, pp. 700-703, (1955).

Sternbach et al., Journal of the American Chemical Society, vol. 74, pp. 2219-2221, (1952).

Thorp, British Journal of Pharmacology and Chemotherapy, vol. 4, pp. 98-104, (1949).

Gillespie et al., Circulation, vol. 25, pp. 281-291, (1962).

Patel et al., Progress In Drug Research, vol. 9, pp. 224-25, 265-277, (1966).

Sjoerdsma et al., Circulation Research, vol. 9, pp. 734-743, (1961).

Sjoerdsma et al., Circulation, vol. 28, pp. 492-502, (1963).

Sletzinger et al., Journal of Medicinal Chemistry, vol. 6, pp. 101-103, (1963).

Schaff et al., Helv. Chem. Acta. vol. 7, pp. 357-363, (1924).

Stein et al., Journal of the Amer. Chem. Soc., vol. 77, pp. 700-703, (1955).

Karrer Organic Chemistry, Second English Edition, Elsevier Pub. Co., pp. 92-100 (1946).

*Primary Examiner*—Alan L. Rotman

EXEMPLARY CLAIM

1. A method of treating hypertension which comprises the oral administration to a hypertensive patient of 0.1 to 5.0 g. of L-α-methyl-3,4-dihydroxyphenylalanine substantially free of its D form.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claim 1 is confirmed.

1. A method of treating hypertension which comprises the oral administration to a hypertensive patient of 0.1 to 5.0 g. of L-α-methyl-3,4-dihydroxyphenylalanine substantially free of its D form.